United States Patent
Mizoguchi et al.

[11] Patent Number: 5,667,299
[45] Date of Patent: Sep. 16, 1997

[54] CYLINDER TEMPERATURE CONTROLLING DEVICE FOR CONTROLLING THE TEMPERATURE OF UPPER AND LOWER CYLINDER BLOCKS INDEPENDENTLY

[75] Inventors: Mitsuaki Mizoguchi; Nobuhisa Kobayashi; Masaharu Ishida; Minoru Yoshida, all of Hiroshima, Japan

[73] Assignee: The Japan Steel Works, Ltd., Tokyo, Japan

[21] Appl. No.: 448,311

[22] Filed: May 23, 1995

[51] Int. Cl.$^6$ .................. B01F 15/06; F28F 21/06
[52] U.S. Cl. .................. 366/145; 366/144; 425/144
[58] Field of Search .................. 366/79, 83, 84, 366/85, 86, 144, 145, 146, 147, 149; 425/144, 143

[56] References Cited

U.S. PATENT DOCUMENTS 4,376,623  3/1983  Robinson et al. .
4,385,876  5/1983  Scherping et al. .

FOREIGN PATENT DOCUMENTS 0147736   7/1985   European Pat. Off. .
2625944   7/1989   France .
2417067  11/1974   Germany .
2423785   9/1975   Germany .
3208312  10/1983   Germany .
4404031   1/1995   Germany .
 220820   8/1993   Japan .

*Primary Examiner*—Tony G. Soohoo
*Attorney, Agent, or Firm*—Sughrue, Mion, Zinn, Macpeak & Seas

[57] ABSTRACT

A cylinder temperature controlling device includes at least one of a plurality of block cylinders split into an upper block and a lower block, said block cylinders arranged in horizontal axis to form a cylinder, heater units, for heating said upper block and said lower block, provided with said upper block and said lower block, respectively, cooling units for cooling said upper block and said lower block, provided with said upper block and said lower block, respectively, and temperature detecting units for detecting a tempature of said upper block and a tempature of said lower block, provided with said upper block and said lower block, respectively.

3 Claims, 6 Drawing Sheets

CYLINDER TEMPERATURE CONTROLLING DEVICE FOR CONTROLLING THE TEMPERATURE OF UPPER AND LOWER CYLINDER BLOCKS INDEPENDENTLY

BACKGROUND OF THE INVENTION

1. Field of the Invention

This invention relates to a method of controlling the temperature of a cylinder for an extruder (hereinafter referred to as "a cylinder temperature controlling method", when applicable), and a device for practicing the method, and more particularly to a novel improvement of a cylinder assembly which is made up of a plurality of cylinder blocks.

2. Related Art

In general, a twin-screw extruder has a wide range of applications, and therefore its cylinder is divided into a plurality of blocks 3 to 3.5D in cylinder length (where D is the diameter of the screws inserted therein). Depending on the purpose of the extruder, a predetermined number of block cylinders are connected to one another to form a cylinder assembly having a necessary length. In addition, a variety of segment screws different in configuration are provided for the cylinder assembly, so that the latter can be designed relatively freely.

The arrangement of a twin-screw extruder using the above-described cylinder assembly is shown in FIG. 8. In FIG. 8, reference numeral 1 designates a driving device for the twin-screw extruder. As shown in FIG. 8, a cylinder assembly 3 is formed by first through fifth block cylinders 3a through 3e which are laid horizontally and connected to one another with four tie bars 2 (only two tie bars shown in FIG. 8) which extend from the driving device 1 through through-holes formed in the block cylinders 3a through 3e. The first through fifth block cylinders 3a through 3e are controlled in temperature by first through fifth heaters 4a through 4e, respectively. Twin screws 5 are rotatably provided in the cylinder assembly 3.

In the cylinder assembly 3, the block cylinders 3a through 3e are most suitably controlled in temperature by the heaters 4a through 4e, respectively. A resin material supplied through a raw material supply port 6 is moved forward while being molten and kneaded by the screws 5, and finally extruded through a die (not shown). On the other hand, FIG. 6 shows a cylinder assembly comprising flanged block cylinders 3b through 3d each of which has flange-shaped coupling ends. In this case, the flanges of the block cylinders are secured to one another with bolts and nuts to form the cylinder assembly.

The conventional method of controlling the temperature of the cylinder assembly which is formed by coupling the block cylinders to one another, and the conventional device for practicing the method, being designed as described above, involve the following problems: That is, resin material is mixed with a variety of raw materials to form complicated compound materials, and a process of melting thermoplastic resin, and a process of kneading and dispersing compound materials or the like are intricate, and therefore it is difficult to theorize those processes by experiment. Hence, in order to detect the state of at least the main part of the material processed under predetermined operating conditions, a method is employed in which the concerned part of the cylinder assembly is divided longitudinally into blocks to visually observe or sample the contents therein. That is, in the case of the cylinder assembly as shown in FIG. 8 which is made up of the block cylinders which are coupled to one another with four tie bars, the cylinder assembly is disassembled into the block cylinders by removing the tie bars; and in the case of the cylinder assembly which is made up of the block cylinders which are coupled to one another through their flanges, the cylinder assembly is disassembled into the block cylinders by removing the bolts and nuts from the flanges. Thus, the operation of disassembling the cylinder assembly into the block cylinders takes a great deal of time and labor.

The cylinder assembly may be modified into one which is splittable along the central axis into an upper cylinder half and a lower cylinder half. However, such a modification is not practical in that the resultant cylinder assembly is high in manufacturing cost, and unsatisfactory in performance. In addition, since the cylinder assembly is large in total length, the flatness of the split surfaces of the upper and lower cylinder halves are adversely affected by thermal distortion, so that if the upper and lower cylinder halves become different in temperature, it is difficult for the split surfaces to be uniformly in contact with each other, and therefore the leakage of resin may occur. Similarly as in the above-described case, the operation of disassembling the cylinder assembly into the upper and lower cylinder halves take a great deal of time and labor. If the cylinder disassembling operation is not achieved within a short time, then for instance external heat adversely affects the performance of the extruder, making it impossible for the latter to operate in the same way again.

After the contents in the cylinder assembly are visually inspected or sampled, it is necessary to restore the cylinder assembly and to start the operation of the extruder. In order to prevent the molten resin material in the cylinder assembly from being cooled and solidified or from being changed in quality or deteriorated, it is essential to achieve the cylinder disassembling operation and the cylinder assembling operation within a short period of time.

SUMMARY OF THE INVENTION

Accordingly, an object of the invention is to solve the above-described problems. More specifically, an object of the invention is to provide a method of controlling the temperature of a cylinder assembly comprising block cylinders in which the state of a material in an optional one of the block cylinders can be visually observed or sampled, and the cylinder assembly can be disassembled or assembled within a short period of time, and a device for practicing the method.

In a method of controlling the temperature of a cylinder assembly for an extruder which is formed by connecting a plurality of block cylinders along a horizontal axis in which the block cylinders are individually controlled in temperature; according to the invention, at least one of the plurality of block cylinders is split into an upper block and a lower block, and the upper block and the lower block are individually controlled in temperature.

In the method, in an ordinary operation, the upper block and the lower block are controlled in temperature under the same conditions, and in disassembling the block cylinder into the upper and lower blocks for observation or in assembling the upper and lower blocks into the block cylinder, the temperature of the upper block is made lower than that of the lower block.

In a device for controlling the temperature of a cylinder assembly for an extruder which is formed by connecting a plurality of block cylinders along a horizontal axis in which the block cylinders are individually controlled in temperature; according to the invention, at least one of the plurality of block cylinders is split into an upper block and a lower block, the upper block and the lower block are provided with heating units, cooling units and temperature detecting units, respectively.

In the device, the plurality of block cylinders are coupled to one another with a plurality of tie bars, and all of the tie bars are extended through the lower block.

In the cylinder temperature controlling method of the invention, and in the device for practicing the method, at least one of the block cylinders is split into the upper and lower blocks which are equal in length, and those upper and lower blocks can be moved into and out of engagement with each other. The upper block is provided With the heating unit, the cooling unit and the temperature detecting unit, and the lower block is also provided with the heating unit, the cooling unit and the temperature detecting unit, so that the upper block and the lower block can be individually controlled in temperature.

The upper and lower blocks are combined together to form the block cylinder, and the block cylinder thus formed and the remaining block cylinders are connected with one another along the horizontal axis to form the long cylinder assembly. In this operation, the block cylinders are connected to one another with a plurality of tie bars and secured to one another with bolts and nuts so that the block cylinders are pushed through their end faces to one another under optimum surface pressure to prevent the leakage of resin from the cylinder assembly. In addition, the upper and lower blocks are under the same surface pressure as long as they are at the same temperature.

The upper block is disengaged from the lower block as follows: As was described above, the block cylinders are tightened with the tie bars, and therefore both the upper and lower blocks are subject to compressive deflection. Hence, in order to disengage the upper block from the lower block, it is necessary to release both end faces of the upper block from the surface pressure. This can be achieved by providing a temperature difference between the upper and lower blocks. That is, the temperature of the upper block is made lower than that of the lower block so that the upper block is contracted; that is, the end faces of the upper block are spaced from the end faces of the right and left block cylinders adjacent to the upper block, thus providing gaps between them. Under this condition, the upper block can be disengaged from the lower block.

The above-described phenomenon may be explained by using mathematical expressions. The amount of deflection $\delta$ of the block cylinder which is due to the initial tightening force (of the tie bars) is obtained from the following equation:

$$E = (W/A)/(\delta/L)$$

where E is the modulus of longitudinal elasticity of the material of the block cylinder, W is the axial weight applied to the block cylinder, A is the cross sectional area of the block cylinder, and L is the axial length of the block cylinder.

From the above expression, $$\delta = (W/A) L/E$$

On the other hand, the amount of thermal deflection $\delta'$ is as follows:

$$\delta' = L \times (\Delta T) \times \mu,$$

Therefore, $$\Delta T = \delta'/(L \cdot \mu)$$

where $\mu$ is the thermal expansion coefficient.

Hence, by substituting $\delta$ for $\delta'$, the temperature difference with which the amount of deflection due to the tightening force and the amount of thermal deflection are equal to each other is obtained. By increasing the temperature difference between the upper and lower blocks, the aforementioned gaps are formed on both end faces of the upper block; that is, the end faces are released, so that the upper block can be disengaged upwardly from the lower block. Hence, the state of the molten resin existing inside the lower block can be directly visually observed.

In the block cylinder which is split into the upper and lower blocks, all the tie bars are extended through the lower block. Hence, when unfastened from the lower block, the upper block can be disengaged upwardly from the lower block.

In the cylinder assembly formed by connecting the flanges of the flanged block cylinders with bolts and nuts, the flanges are connected to each other under suitable surface pressure by the tightening force of the bolts and nuts.

In the cylinder assembly designed in the above-described manner, the force applied to it in the longitudinal direction is eliminated when the flanges are released by loosening the bolts and nuts. However, in this case, since the upper and lower blocks are equal in length, no gap is formed between the flanges, and therefore it is difficult to disengage the upper block from the lower block. In order to overcome this difficulty, the following method is employed: A temperature difference is provided between the upper and lower blocks; more specifically, the temperature of the upper block is made lower than that of the lower block, so that the upper block is thermally contracted, to form gaps between the flanges of the upper block and the flanges of the right and left block cylinders adjacent to it. Thus, by unfastening the upper block from the lower block, the former block can be readily disengaged from the lower block. A necessary temperature difference with respect to a given amount of thermal contraction $\delta'$ can be obtained from the above-described expression $\{\delta' = L \times (\Delta T) \times \mu\}$.

In order to start the operation again after the disengagement of the upper block from the lower block, the temperature of the upper block is controlled in the same manner so that the upper block can be set on the lower block to form the block cylinder.

Thereafter, the upper block is coupled to the lower block, and control is so made that the upper and lower blocks are equal in temperature, and then the upper block is fixedly secured to the lower block. In the cylinder assembly made up of the flanged block cylinders, the block cylinders are connected to one another with the predetermined surface pressure applied to their end faces. With the cylinder assembly thus formed, the extruder may start its operation again.

DETAILED DESCRIPTION OF THE PREFERRED EMBODIMENTS

Figure 7:
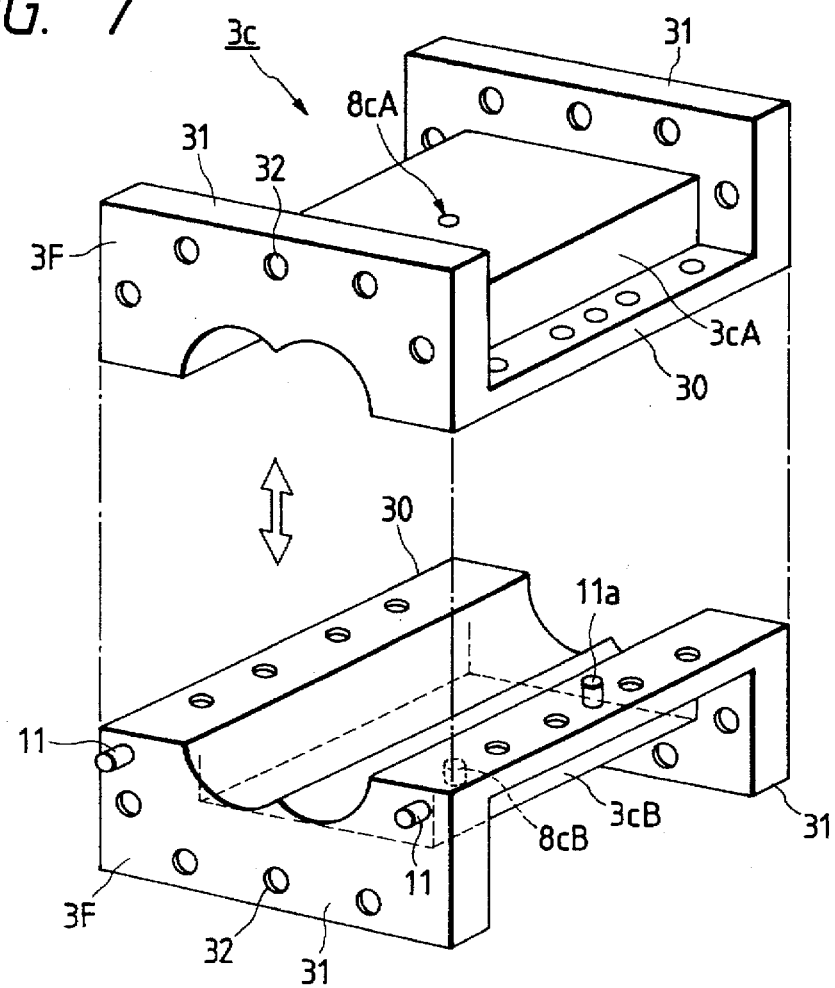
FIG. 7 is an enlarged perspective view of the split type block cylinder shown in FIG. 6 which is opened with an upper block being disengaged from a lower block.
Figure 8:
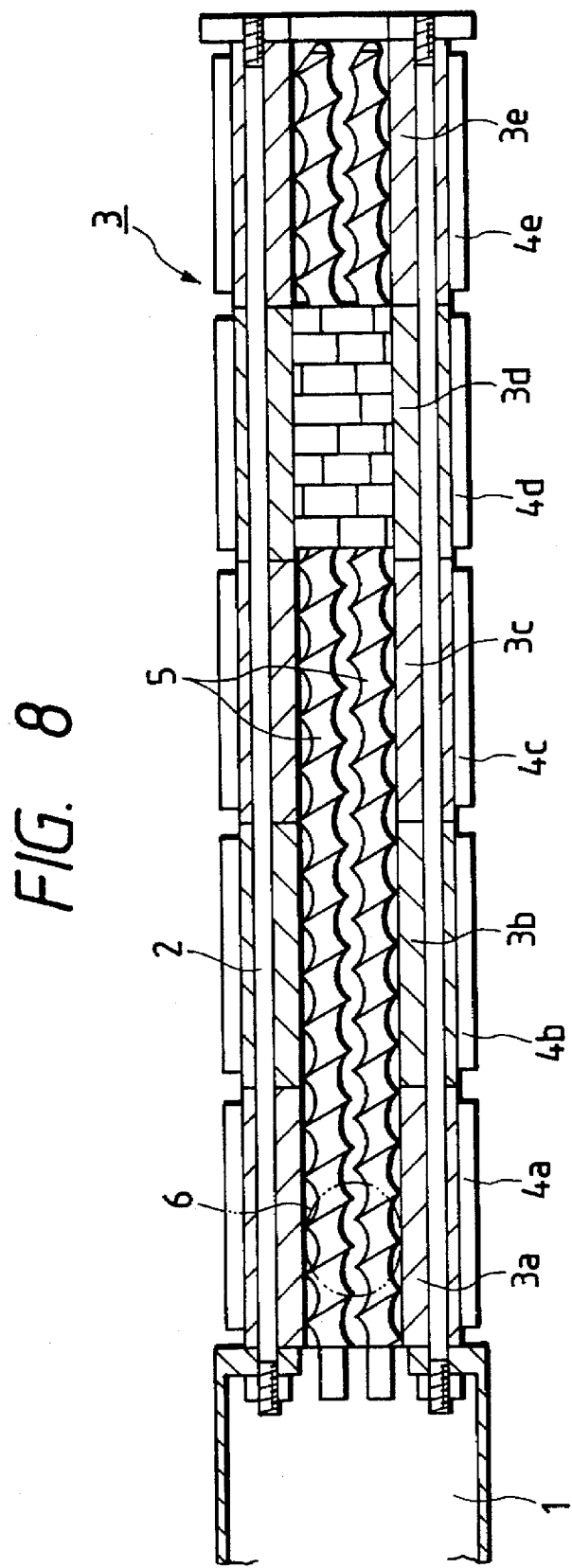
FIG. 8 is a sectional view showing a conventional cylinder assembly for an extruder.

A cylinder temperature controlling method of the invention, and a device for practicing the method will be described with reference to FIGS. 1 through 7, in which parts corresponding functionally to those which have been described with reference to the prior art shown in FIG. 8 are therefore designated by the same reference numerals or characters.

Figure 1:
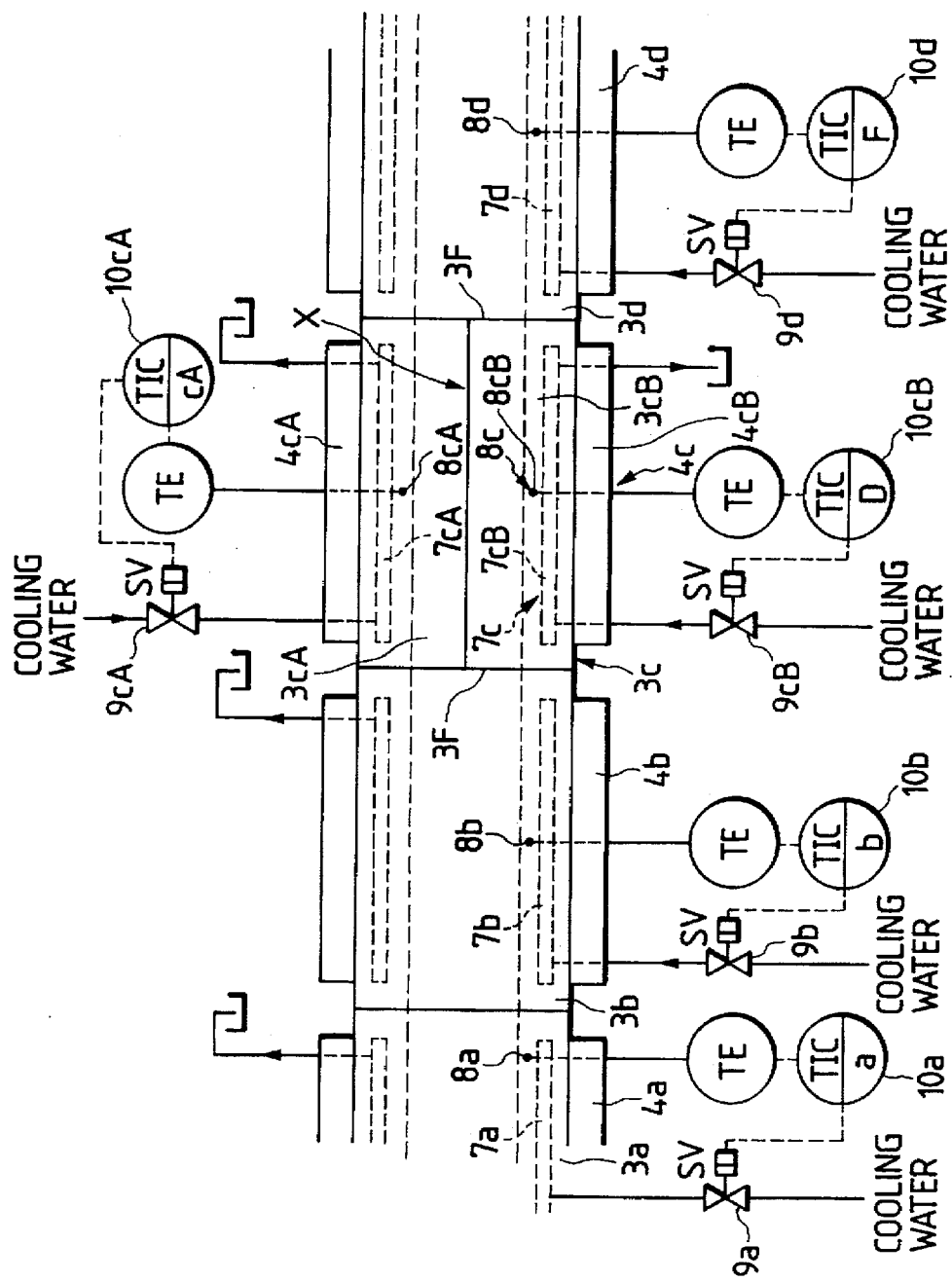
FIG. 1 is a diagram showing the arrangement of a system of controlling the temperatures of block cylinders according to the invention.
Figure 2:
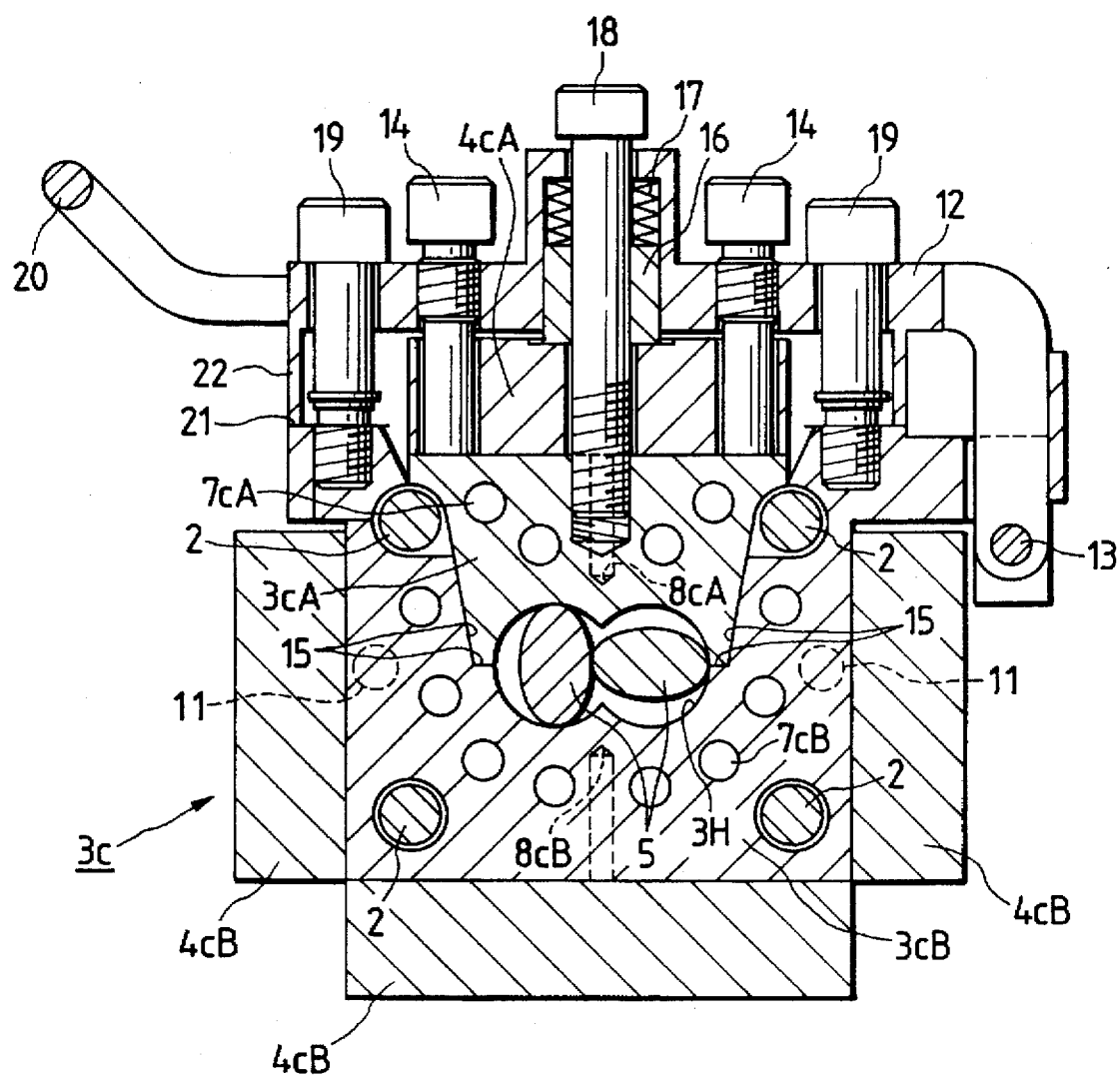
FIG. 2 is a sectional view showing a first example of a split type block cylinder.
Figure 3:
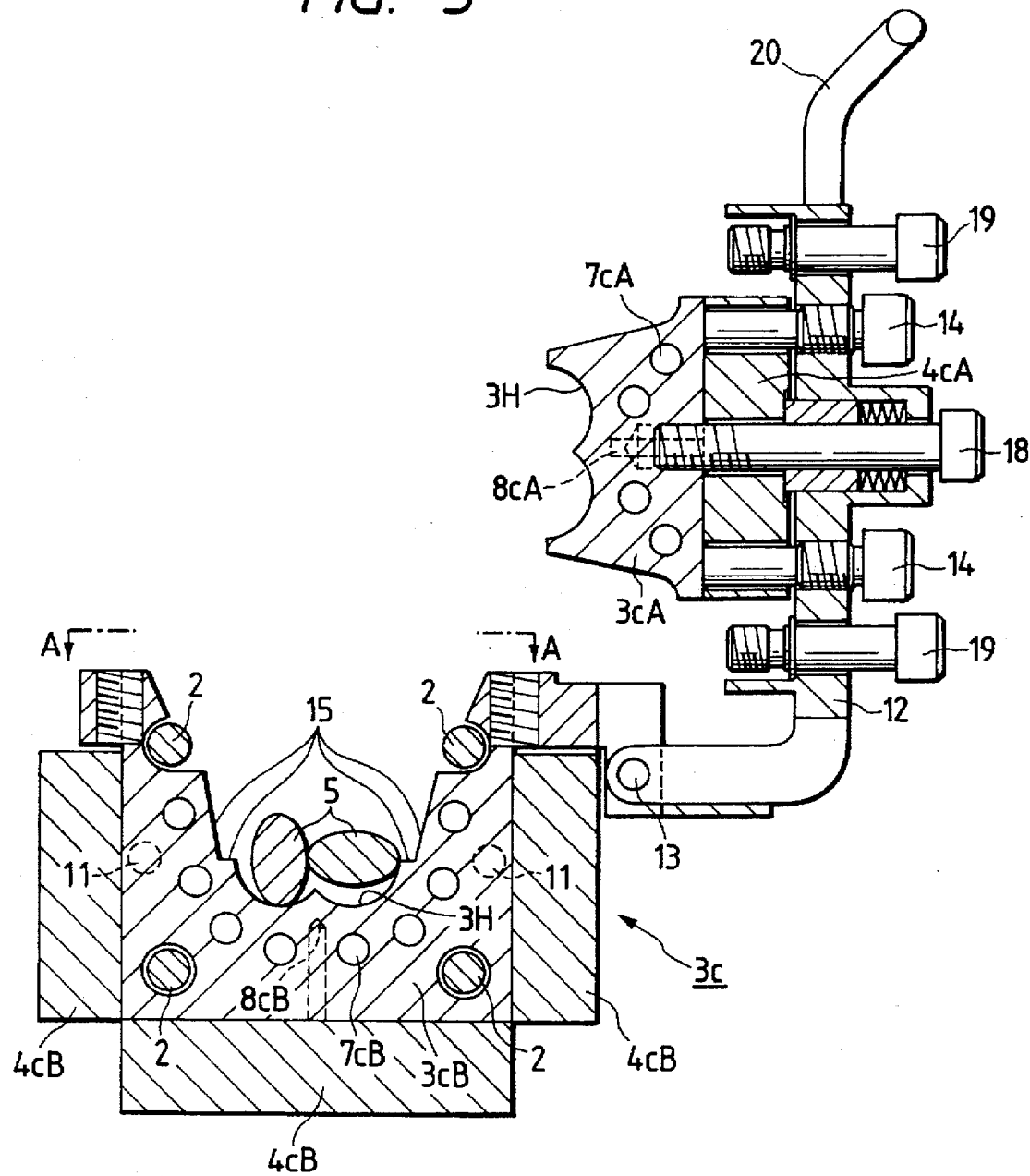
FIG. 3 is a sectional view showing the split type block cylinder which is opened with an upper block being swung from a lower block.
Figure 4:
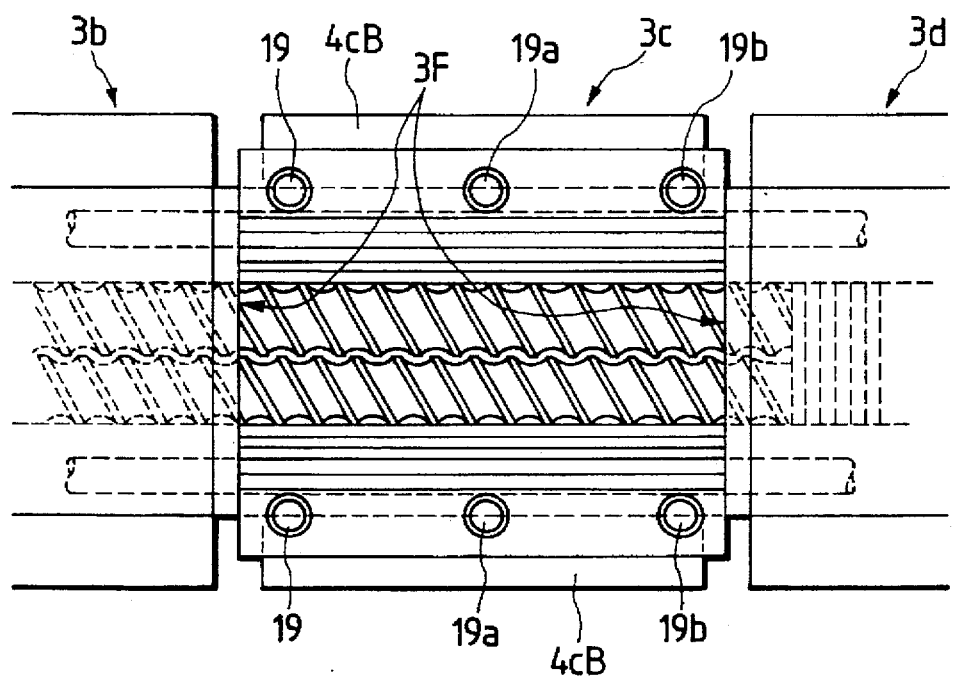
FIG. 4 is a plan view taken along line A—A in FIG. 3.
Figure 5:
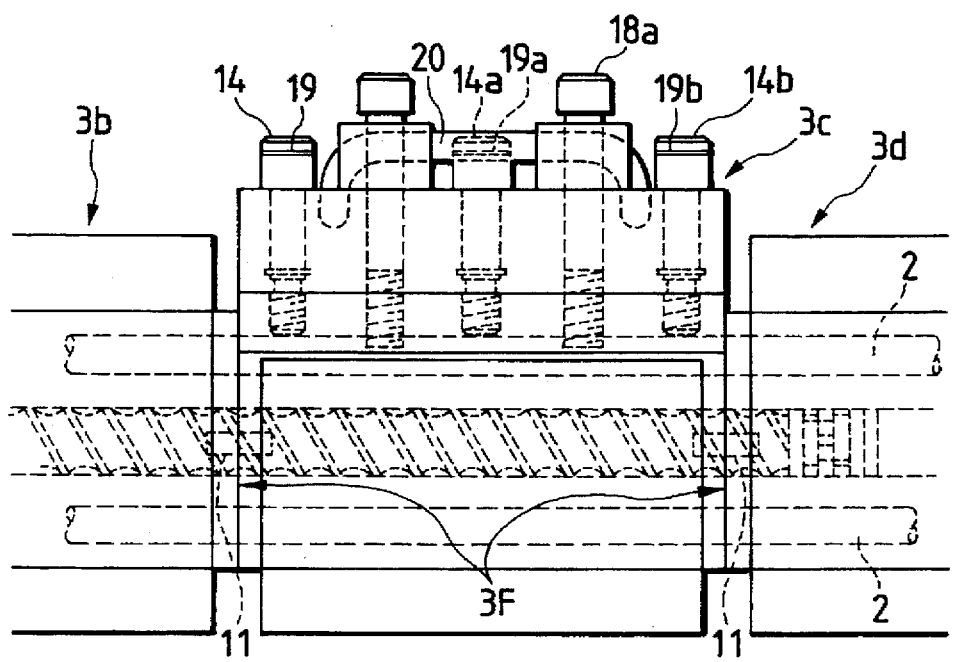
FIG. 5 is a side view of the split type block cylinder shown in FIG. 2.
Figure 6:
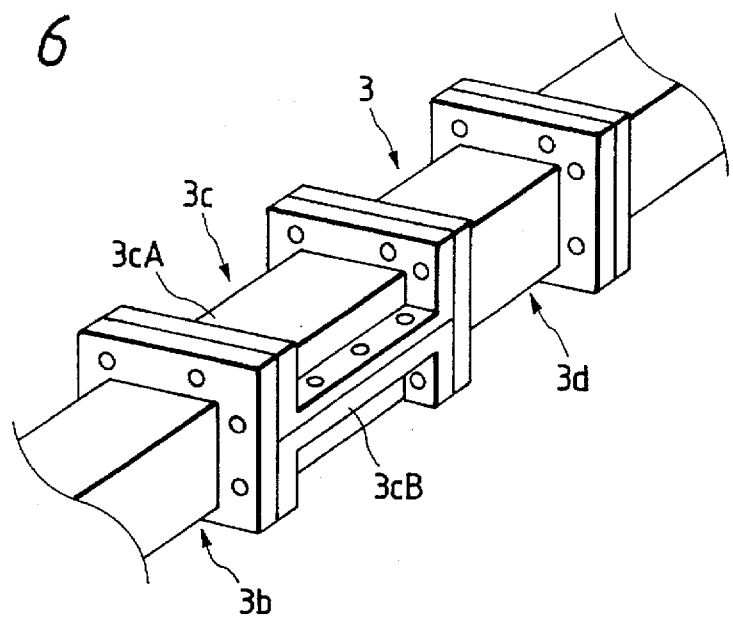
FIG. 6 is a perspective view showing a second example of the split type block cylinder.

FIGS. 1 through 7 show the device for practicing the method of the invention. More specifically, FIG. 1 is a diagram showing the arrangement of a temperature controlling system. FIG. 2 is a sectional view a first example of a split type block cylinder. FIG. 3 is a sectional view showing the split type block cylinder which is opened with an upper block being swung from a lower block. FIG. 4 is a plan view taken along line A—A in FIG. 3. FIG. 5 is a side view of the split type block cylinder shown in FIG. 3. FIG. 6 is a perspective view showing a second example of the split type block cylinder. FIG. 7 is an enlarged perspective view of the split type block cylinder shown in FIG. 6 which is opened with its upper block being disengaged from its lower block.

In FIG. 1, reference characters $3a$ through $3d$ designate first through fourth block cylinders which form a cylinder assembly 3. One of the block cylinders, namely, the block cylinder $3c$ is a split type block cylinder according to the invention (two or more of the block cylinders may be split type block cylinders as the case may be), and the remaining block cylinders $3a$, $3b$ and $3d$ are non-split type block cylinders.

The block cylinders $3a$ through $3d$ are provided with heating units $4a$ through $4d$ made up of heaters, cooling devices $7a$ through $7d$ made up of cooling jackets, temperature detecting devices $8a$ through $8d$, electromagnetic valves $9a$ through $9d$ for cooling water (hereinafter referred to as "cooling water electromagnetic valves $9a$ through $9d$", when applicable), and temperature adjusting devices $10a$ through $10d$, respectively. The third block cylinder $3c$ comprises an upper block $3cA$ and a lower block $3cB$ which are separable from each other. The heating device $4c$ comprises an upper heating unit $4cA$ and a lower heating unit $4cB$. The cooling device $7c$ comprises an upper cooling unit $7cA$ and a lower cooling unit $7cB$. The temperature detecting device $8c$ comprises an upper temperature detecting unit $8cA$ and a lower temperature detecting unit $8cB$. The cooling water electromagnetic valve $9c$ comprises an upper cooling water electromagnetic valve unit $9cA$, and a lower cooling water electromagnetic valve unit $9cB$. The temperature controlling device $10c$ also comprises an upper temperature controlling unit $10cA$ and a lower temperature controlling unit $10cB$.

In FIG. 1, reference character X designates the splitting plane along which the block cylinder $3c$ is split into the upper and lower blocks $3cA$ and $3cB$.

In the cylinder assembly 3 formed by coupling the block cylinders $3a$ through $3d$ to one another with tie bars 2, a first example of the third block cylinder $3c$ is designed as shown in FIGS. 2 through 5. That is, the third block cylinder $3c$ is split into the upper block $3cA$ and the lower block $3cB$ by a splitting line 15 which, as viewed in the section taken across the axes of screws 5 set in the third block cylinder $3c$, describes substantially an inverted trapezoidal groove which is defined by two right and left horizontal lines extended from the middles of both side surfaces of an internal hole 3H accommodating the screws 5 and two oblique lines which are extended upwardly from the outer ends of the two right and left horizontal lines over the inner side surfaces of the tie bars 2. The upper block $3cA$ is swingably coupled to the lower block $3cB$ through a supporting pin 13 and a hinge plate 12 in such a manner that the upper block $3cA$ is swung into and out of engagement with the lower block $3cB$. The upper block $3cA$ and the lower block $3cB$ are equal in longitudinal length. The third block cylinder $3c$ is fastened to its right and left block cylinders $3d$ and $3b$ with the four tie bars 2 with optimum surface pressure applied to both end faces 3F and 3F so that the leakage of resin therefrom is prevented.

The third block cylinder $3c$ is aligned with the right and left block cylinders $3d$ and $3b$ with knock pins 11 formed on the lower block $3cB$. As a result, all the block cylinders $3a$ through $3d$ are made coaxial with one another.

The upper block $3cA$ is fastened to the lower block $3cB$ as follows: The hinge plate 12 provided outside the upper block $3cA$ is fixedly secured to the lower block $3cB$ with fastening bolts 19, and the upper block $3cA$ is pushed from outside through the hinge plate 12 with push bolts 14, so that optimum surface pressure is applied to the joining surface 15 of the upper and lower blocks $3cA$ and $3cB$, thereby to prevent the leakage of resin.

In order to swing the hinge plate 12 together with the upper block $3cA$, a lifting bolt 18 is provided substantially at the center of the hinge plate 12. More specifically, the hinge plate 12 is coupled through the upper heating unit $4cA$, a washer 16 and a compression spring 17 to the upper block $3cA$ with the lifting bolt 18. With the aid of the compression spring 17, the upper heating unit $4cA$ is pushed against the outer surface of the upper block $3cA$, while the upper block $3cA$ and the hinge plate 12 are pushed against each other through the upper heating unit $4cA$. The swinging fulcrum of the hinge plate 12 is on the supporting pin 13 which is embedded in one end portion of the hinge plate 12 as shown in the right part of FIG. 2. The other end portion of hinge plate 12 is formed into a handle 20.

As shown in FIG. 3, the lower block $3cB$ is in the form of a channel bar, having the groove 15 extended along the axis from end to end, the section of which is defined by the above-described two right and left horizontal lines and two oblique lines. The upper block $3cA$ is inserted into the groove 15 from above. The lower heating units $4cB$ are provided on the outer surfaces of the lower block $3cB$, and the lower cooling unit $7cB$ is provided inside the lower block $3cB$. The lower cooling unit $7cB$ comprises a plurality of cooling water holes which are extended in the body of the lower block $3cB$ substantially over the entire length. In order to control the temperature of the lower block $3cB$ only, the lower temperature detecting unit $8cB$ is set in a hole which is so formed in the lower block $3cB$ that it is located below the middle of the internal hole 3H at the middle of the whole length of the lower block $3cB$.

The upper block $3cA$ is substantially trapezoidal in section; that is, it is shaped to just fit in the groove 15 of the lower block $3cB$. The upper heating unit $4cA$ is provided on the upper surface of the upper block $3cA$, and the upper cooling unit $7cA$ is provided inside the upper block $3cA$. The upper cooling unit $7cA$ comprises a plurality of cooling water holes which are extended in the body of the upper block $3cA$ substantially over the entire length. In order to control the temperature of the upper block 3cA only, the upper temperature detecting unit 8cA is set in a hole which is so formed in the upper block 3cA that it is located above the middle of the internal hole 3H at the middle of the whole length of the upper block 3cA. As is apparent from the above description, the upper block 3cA and the lower block 3cB are provided with the heating units 4cA and 4cB, the temperature detecting units 8cA and 8cB, the cooling units 7cA and 7cB, the cooling water electromagnetic valves 9cA and 9cB, and the temperature controlling units 10cA and 10cB, respectively. Thus, the upper block 3cA and the lower block 3cB can be controlled in temperature independently of each other.

The temperature control of those block cylinders will be described.

In an ordinary operation, the block cylinders 3a through 3d forming the cylinder assembly 3 are individually controlled in temperature according to operating conditions. In the third block cylinder 3c which is splittable into the upper and lower blocks 3cA and 3cB, blocks 3cA and 3cB are joined together, and their temperatures are controlled by the temperature adjusting units 10cA and 10cB to be the same temperature.

When it is required to open the third block cylinder 3c by disengaging the upper block 3cA from the lower block 3cB, control is made as follows: First, the extruder and accordingly the screws 5 are stopped. Next, the push bolts 14 are loosened, and the fastening bolts 19 are removed, to unfasten the upper block 3cA from the lower block 3cB. And the upper temperature controlling unit 10cA is separated from the lower temperature controlling unit 10cB, and the set value of the former 10cA is made lower than that of the latter 10cB by a predetermined value. As a result, the temperature of the upper block 3cA becomes lower than that of the lower block 3cB by the predetermined value.

As a result, the upper block 3cA is thermally contracted. When the thermal contraction overcomes the amount of deflection provided by the fastening force of the tie bars 2, gaps are formed between the upper block 3cA and the right and left block cylinders 3d and 3b. Since the gaps are formed on both sides of the upper block 3cA as viewed in the axial direction, the upper block 3cA can be readily disengaged from the lower block 3cB.

Under this condition, the handle 20 is raised to swing the hinge plate 12 about the supporting pin 13, so that the upper block 3cA is disengaged from the lower block 3cB and set aside the latter 3cB. Thus, in the third block cylinder 3c, shown in FIG. 3, more than the upper half of the internal hole 3H is exposed.

Thereafter, in order to allow the extruder to perform the steady operation again, the above-described operating steps are performed in the reverse order. That is, the upper block 3cA, whose temperature is lower by the predetermined value than that of the lower block 3cB which is kept heated, is engaged with the lower block 3cB. Next, the upper temperature controlling unit 10cA is set to the same temperature value as the lower temperature controlling unit 10cB, so that the two temperature controlling units 10cA and 10cB operate as one unit. The fastening bolts 19 are tightened, and the push bolts 14 are pushed, to join the upper and lower blocks 3cA and 3cB together.

As a result, the upper block 3cA is thermally expanded, so that the gaps between the lower block 3cB and the right and left block cylinders 3d and 3b are eliminated, and a pushing force; i.e., contact surface pressure is applied to the contact surfaces of the upper and lower blocks 3cA and 3cB to positively join those blocks 3cA and 3cB together.

In the above-described temperature control, the temperature of the upper block 3cA is made lower than that of the lower block 3cB to form the gaps on both ends of the former 3cA, and the upper block 3cA is disengaged from the lower block 3cB to expose the inside of the latter. This temperature control will be described in greater detail.

The amount of deflection δ of the block cylinder 3c which is due to the tightening force of four tie bars 2 can be obtained from the following equation:

$$\delta = (W/A)L/E$$

where W is the axial load applied to the block cylinder, A is the sectional area of the block cylinder; L is the axial length of the block cylinder; and E is the modulus of longitudinal elasticity.

It is assumed that

W=2000×4 kgf,

A=4000 mm$^2$,

L=210 mm, and

E=21000 kgf/mm$^2$, then $$\delta = (2000 \times 4) \times 210/(4000 \times 21000) = 0.02 \text{ mm}$$

A temperature difference ΔT for obtaining an amount of thermal deflection equivalent to an amount of deflection δ can be obtained from the following equation:

$$\Delta T = \delta/(L \cdot \mu)$$

where L is the axial length of the block cylinder, and μ is the thermal expansion coefficient of the block cylinder material.

If it is assumed that L=210 mm, and $$\mu = 11 \times 10^{-6}/°C.,$$

then $$\Delta T = 0.02/(210 \times 11 \times 10^{-6}) = 8.7° \text{ C.}$$

Hence, when the temperature of the upper block 3cA is made lower than that of the lower block 3cB as much as 8.7° C. or more, the aforementioned gaps are provided on both end faces 3F of the upper block 3cA; that is, the end faces 3F are released, so that the upper block 3cA can be swung upwardly.

A second example of the third block cylinder 3c is as shown in FIGS. 6 and 7. In this case, a plurality of block cylinders 3a through 3d forming a cylinder assembly 3 have flanges through which they are coupled to one another. More specifically, the upper and lower blocks 3cA and 3cB have side flanges 30, and end flanges 31 as shown in FIG. 7. The upper and lower blocks 3cA and 3cB are fastened together through the side flanges 30 with bolts and nuts to form the third block cylinder 3c; and the third block cylinder 3c thus formed are connected to the right and left block cylinders 3d and 3b through the end flanges 31 with bolts and nuts.

The upper and lower blocks 3cA and 3cB are equal in length. The upper block 3cA has the heating unit and the cooling unit, and the lower block 3cB also has the heating unit and the cooling unit. In addition, the upper block 3cA has the temperature detecting unit 8cA substantially at the middle, and the lower block 3cB also has the temperature detecting unit 8cB substantially at the middle, so that the upper and lower blocks 3cA and 3cB are individually controlled in temperature (not shown). The lower block 3cB has knock pins 11 on the end faces 3F with which the lower block 3cB is held biaxially in alignment with the right and left block cylinders 3d and 3b. The upper and lower blocks 3cA and 3cB are connected to the right and left block cylinders 3d and 3b with bolts inserted into fastening bolt holes 32 formed in the end flanges 31 thereof. A knock pin 11a is embedded in the joining surface of the side flange of the lower block substantially at the middle to limit the play of the upper and lower blocks 3cA and 3cB in the direction perpendicular to the direction of axis, and the end faces of the right and left block cylinders 3d and 3b limit the play of the upper and lower blocks 3cA and 3cB in the direction of axis.

In disassembling the block cylinder 3c for inspection, no great compressive deflection such as that in the case of a tie-bar system is developed in the direction of axis (in the longitudinal direction of the cylinder assembly); however, if the resin exits on the junctions of the third block cylinder 3c and the right and left block cylinders 3d and 3b even slightly then a relatively great force is required to move the upper block upwardly. Hence, similarly as in the case of the first example of the third block cylinder, it is preferable that the temperature of the upper block 3cA is made slightly lower than that of the lower block 3cB. This temperature control forms gaps on both ends of the upper block 3cA with the knock pin 11a as the center of contraction, which makes it easy to move the upper block 3cA upwardly from the lower block 3cB.

While the invention has been described with reference to the twin-screw extruder, it should be noted that the invention is not limited thereto or thereby. That is, the technical concept of the invention may be applied to a single-screw extruder.

In the above-described embodiments, the block cylinder is split into the upper and lower blocks along the cylinder splitting plane which is at the middle level of the internal hole therein; however, the invention is not limited thereto or thereby. That is, the cylinder splitting plane may be shifted above the middle level of the internal hole. In addition, a plurality of the block cylinders thus split may be arranged one after another or at intervals.

In the temperature control of the split block cylinder, it is essential that a predetermined temperature difference is maintained between the upper and lower blocks. For this purpose, the temperature of the lower block instead of the upper block may be changed. In this case, too, the above-described effects can be obtained.

The cylinder temperature controlling method of the invention, and the device for practicing the method, being designed as described above, have the following effects or merits:

At least one of the block cylinders; namely, the selected block cylinder is split into the upper and lower blocks. The temperature of the upper block is controlled so as to form the gaps between both end faces of the upper block and the end faces of the block cylinders set adjacent to the selected block cylinder, or to eliminate the gaps thus formed, whereby the upper block can be moved into or out of engagement with the lower block. That is, by providing the predetermined temperature difference between the upper and lower blocks, the state of the molten resin in the lower block can be quickly and accurately observed; that is, in the steady operation of the extruder, the state of the molten resin can be directly observed as it is. In addition, when it is required to perform the operation of the extruder again, the upper and lower blocks forming the selected block cylinder and the remaining block cylinders can be quickly and readily assembled to form the cylinder assembly; that is, the cylinder assembly can be quickly and readily obtained which is the same in state as is accurately formed at room temperature.

What is claimed is:

1. A cylinder temperature controlling device comprising:

a plurality of block cylinders arranged in a linear manner;

at least one of said plurality of block cylinders is split into an upper block and a respective lower block, said block cylinders arranged along an axis to form a cylinder;

heater units, for heating said upper block and said lower block, disposed on said upper block and said lower block, respectively;

cooling units, for cooling said upper block and said lower block, disposed on said upper block and said lower block, respectively; and temperature detecting units for detecting a temperature of said upper block and a temperature of said lower block, disposed on said upper block and said lower block, respectively, said temperature detecting units comprising control means coupled to the heater units and the cooling units for independently controlling the temperature of said upper block and said lower block wherein said control means controls the temperature of said upper block and said lower block to be the same in a normal operation wherein the cylinder is assembled, and said control means controls the temperature of said upper block to be lower than a temperature of said lower block in a disassembling operation of said cylinder.

2. A cylinder temperature controlling device as claimed in claim 1, further comprising:

a plurality of tie bars for coupling said block cylinders to each other said tie bars being extended through said lower block and being coupled to an endmost two of said block cylinders to thereby apply compression to each block cylinder.

3. A cylinder temperature controlling device as recited in claim 1, wherein during said disassembling operation, said control means controls the temperature of the upper block to be lower than the temperature of the lower block by $\Delta T$ which is defined by the following equation:

$$\Delta T = \delta/(L \cdot \mu)$$

where L is the axial length of the block cylinder, $\delta$ is the desired amount of deflection, in the longitudinal axial direction of the cylinder, due to thermal contraction for the upper block and $\mu$ is the thermal expansion coefficient of the cylinder material.

* * * * *